(12) United States Patent
Minami et al.

(10) Patent No.: US 8,063,500 B2
(45) Date of Patent: Nov. 22, 2011

(54) MAINTENANCE OPERATION METHOD FOR WIND TURBINE GENERATOR AND WIND TURBINE GENERATOR

(75) Inventors: Tohru Minami, Tokyo (JP); Mitsuyoshi Fukuda, Tokyo (JP); Eiji Irie, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/675,310

(22) PCT Filed: Feb. 18, 2010

(86) PCT No.: PCT/JP2010/052445
§ 371 (c)(1),
(2), (4) Date: Apr. 5, 2011

(65) Prior Publication Data
US 2011/0187105 A1    Aug. 4, 2011

(51) Int. Cl.
*H02P 9/48* (2006.01)
(52) U.S. Cl. ............................................. 290/44; 322/24
(58) Field of Classification Search ................... 290/43, 290/44, 55; 322/24, 28
See application file for complete search history.

(56) References Cited

U.S. PATENT DOCUMENTS

| | | | |
|---|---|---|---|
| 4,160,170 A | | 7/1979 | Harner et al. |
| 4,677,364 A | * | 6/1987 | Williams et al. ................. 322/47 |
| 5,039,933 A | * | 8/1991 | Dong ............................. 322/47 |
| 5,278,773 A | | 1/1994 | Cousineau |
| 5,986,438 A | * | 11/1999 | Wallace et al. ................. 322/20 |
| 6,815,934 B2 | * | 11/2004 | Colley ............................. 322/47 |
| 7,253,537 B2 | * | 8/2007 | Weng et al. ..................... 290/44 |
| 7,579,702 B2 | * | 8/2009 | Park et al. ....................... 290/44 |
| 7,830,127 B2 | * | 11/2010 | Corcelles Pereira et al. ... 322/24 |

(Continued)

FOREIGN PATENT DOCUMENTS

EP    2 071 691 A2    6/2009

(Continued)

OTHER PUBLICATIONS

Ake Larsson, "The Power Quality of Wind Turbines", Ph.D. Thesis Chalmers University of Technology, Geoteborg, Sweden, 2000, Section 2.1, Section 3.1, figure 3.1, Section 3.2.1, fig. 3.4, Section 4.2.2, fig. 4.6, Section 4.4, Section 3.2.3, Section 5.2 Conclusions, Paper 2A, Paper 4C (section II B).

*Primary Examiner* — Nicholas Ponomarenko
(74) *Attorney, Agent, or Firm* — Manabu Kanesaka; Kenneth M. Berner; Benjamin J. Hauptman

(57) ABSTRACT

The present invention provides a maintenance operation method for a wind turbine generator and a wind turbine generator, which can effectively utilize a phase advance capacitor equipped in the wind turbine generator and contribute to the phase factor improvement of the system side. A maintenance operation method for a wind turbine generator including an induction generator 3 driven by rotation of blades 2, a power output line 5 for outputting power of the induction generator 3 to a distribution system 5, and at least one phase advance capacitor 10 parallel-connected to the power output line, comprises: a first step of releasing connection between the phase advanced capacitor 10 and the power output line 5 when a maintenance mode is selected; and a second step of returning the connection between the phase advanced capacitor 10 and the power output line 5 by a manual operation or an automatic operation, wherein the phase advance capacitor 10 returned to the connection with the power output line 5 performs a power factor improvement of reactor loads 53, 54 in the distribution system 50 side through a linkage portion 60 with the distribution system 50.

4 Claims, 6 Drawing Sheets

FOREIGN PATENT DOCUMENTS

| | | |
|---|---|---|
| JP | H09-163609 A | 6/1997 |
| JP | H11-041990 | 2/1999 |
| JP | 2003-242231 | 8/2003 |
| JP | 2006-109568 | 4/2006 |
| JP | 2007-20365 A | 1/2007 |
| WO | WO 2007/141669 | 12/2007 |

* cited by examiner

MAINTENANCE OPERATION METHOD FOR WIND TURBINE GENERATOR AND WIND TURBINE GENERATOR

RELATED APPLICATIONS

The present application is National Phase of International Application No. PCT/JP2010/052445 filed Feb. 18, 2010, the disclosure of which is hereby incorporated by reference herein in its entirety.

BACKGROUND OF THE INVENTION

1. Field of the Invention

The present invention relates to a maintenance operation method for a wind turbine generator including an induction generator and a phase advance capacitor, and a wind turbine generator thereof. In particular, the invention relates to a maintenance operation method for a wind turbine generator including a tower provided to stand on the ground or on the water, a nacelle supported on the tower to be controlled to rotate in the yaw direction, and a plurality of rotatable blades with blade pitch control provided to the nacelle, wherein a power factor of a induction generator can be improved, and a wind turbine generator thereof.

2. Description of the Related Art

In recent years, the use of a wind turbine generator to generate renewable energy has become popular in view of environmental preservation.

A large size wind turbine generator often adopts the so-called a nacelle type wind turbine generator comprising a rotor head equipped with blades, a nacelle for accommodating a drive train and a generator, and a tower for supporting the nacelle. The drive train is for transmitting a torque from the rotor head side to the generator side, and usually includes a speed increasing gear so that rotational speed of the rotor head is increased to transmit to the generator In this type of wind turbine generator, an induction generator has been in general use. However, a power factor control cannot be performed because the operation power factor is decided corresponding to the output power of the generator. Therefore, in the conventional generator, a phase advance capacitor is parallel-connected to the power output line 5 so as to improve the lagging power factor of the power output.

For example, Japanese Unexamined Patent Application Publication No. H11-41990 (Patent Publication 1) shows a construction in which a plurality of the power generator units are arranged in parallel, and each of the power generator units includes a phase advanced capacitor connected to an output line of the power generator via a magnetic switch, respectively, wherein the number of the connected phase advanced capacitor is increased according to decline of the total power output so that a power factor of the power output is controlled to keep a constant value. Japanese Unexamined Patent Application Publication No. 2006-109568 (Patent Publication 2) shows a construction in which a linkage device is inserted in an output line connecting an induction generator and a distribution system, wherein the linkage device includes a contactor for linking the induction generator with the distribution system, wherein the phase advance capacitor is connected via a switching element to the output line between the contactor and the distribution system. According to the construction described above, the phase advance capacitor is connected to the output line before the contactor is turning ON, thereby controlling the voltage fluctuation.

PRIOR ART

[Patent Publication 1] Japanese Unexamined Patent Application Publication No. H11-41990

[Patent Publication 2] Japanese Unexamined Patent Application Publication No. 2006-109568

SUMMARY OF THE INVENTION

However, the power factor improvement circuit using the phase advance capacitor, equipped on the conventional wind turbine generator, is aimed to only the power factor improvement of the output power. The power factor improvement circuit makes the phase advance capacitor in parallel off not to use it, and therefore the utilization rate of the phase advance capacitor is not high.

On the other hand, there exists a lot of reactor loads in the distribution system causing the lagging power factor, however, it is difficult to install a power factor improvement circuit for each reactor load to improve the lagging power factor because of its cost. Moreover, if such phase advance capacitor is installed, for example, in inverter devices such as an air conditioner located in each house or business office, there is a risk of heat generation or firing. Therefore, the subject of installing of such phase advance capacitor is limited to a sort of electrical machinery and apparatus that has no risk of heat generation or firing.

If a lot of the reactor loads exist, the total system phase factor is decreased, and therefore the bigger capacity of a transformer or a circuit breaker is required in order to adapt thereto.

Accordingly, the present invention was made to solve the above problems, by providing a maintenance operation method for a wind turbine generator and a wind turbine generator, which can effectively utilize a phase advance capacitor equipped in the wind turbine generator and contribute to the phase factor improvement of the system side.

The present invention provides a maintenance operation method for a wind turbine generator, including an induction generator driven by rotation of blades, a power output line for outputting power of the induction generator to a distribution system, and at least one phase advance capacitor parallel-connected to the power output line, comprising; a first step of releasing connection between the phase advanced capacitor and the power output line when a maintenance mode for placing the blades in a feathering state (rotation stop) is selected; and a second step of returning the connection between the phase advanced capacitor and the power output line by a manual operation or an automatic operation, wherein the phase advance capacitor returned to the connection with the power output line performs a power factor improvement of reactor loads in the distribution system side through a linkage portion with the distribution system.

In the present invention, when the wind turbine generator is placed in a standby state or stopped in the maintenance mode, the phase advance capacitor which has been released the connection with the power output line is connected to the power output line again by a manual operation or an automatic operation so that the phase advance capacitor can be utilized for the power factor improvement. Accordingly, the phase advance capacitor provided in the wind turbine generator can be effectively utilized and contributed to the phase factor improvement of the system side. It should be noted that the distribution (commercial) system means a system for feeding to the loads from a commercial power.

In another aspect, the present invention provides a wind turbine generator including a nacelle supported on the a tower provided to stand on the ground or on the water, and a plurality of blades with blade pitch control supported to the nacelle, wherein an induction generator driven by rotation of the blades is accommodated in the nacelle, and a power output line for outputting power of the induction generator to a distribution system and at least one phase advance capacitor parallel-connected to the power output line are accommodated in the nacelle or the tower, comprising: a control circuit provided in at least one of the nacelle or the tower, and for connecting of or releasing the connecting of the power output line and the phase advance capacitor, wherein the control circuit includes a first control unit for releasing connection between the phase advanced capacitor and the power output line when the blades are switched from a rotation mode for rotating the blades to a maintenance mode for placing the blades in a feathering state (rotation stop); a second control unit for returning the connection between the phase advanced capacitor and the power output line by an operation signal from an operating signal generating unit provided in the external; and a third control unit for connecting the phase advance capacitor, which has been returned to the connection with the distribution system side, to the distribution system side through a linkage portion linked with the distribution system.

In such arrangement, when the wind turbine generator is placed in a standby state or stopped in the maintenance mode, the phase advance capacitor which has been released the connection with the power output line is connected to the power output line again by the operation signal from the external operating signal generating unit so that the phase advance capacitor is utilizing for the power factor improvement. Accordingly, the phase advance capacitor provided in the wind turbine generator can be effectively utilized and contributed to the phase factor improvement of the system side. Moreover, a series of the control mentioned above is performed by the control circuit of the wind turbine generator, and therefore the phase advance capacitor can be most effectively utilized according to the operation state of the wind turbine generator.

Preferably, the operating signal generating unit provided in the external includes a portable terminal, that comprises: a connecting portion connectable to a connector provided in at least one of the nacelles and the tower; an operating ends group includes an operating button generates an operating signal for connecting of or releasing the connecting of the power output line and the phase advance capacitor; and a display portion for displaying an operation state of the operating ends group.

In such arrangement, since the operating signal for commanding the connection or the release of the connection is input from the portable terminal connectable to the wind turbine generator, the phase advance capacitor can be quickly utilized again by an operator corresponding to the standby state or the stop operation of the wind turbine generator. Accordingly, the convenience of the wind power generator can be improved and the occupancy of utilization of the capacitor can be raised.

Preferably, a plurality of the phase advance capacitors are parallel-connected to the power output line, and the operating ends group can set individually connecting of or releasing of the connecting of each of the phase advance capacitors and the power output line.

Thus, the connection of each phase advance capacitor is individually set according to the lagging power factor estimated in the distribution system side, and thereby the performance of the power factor improvement in the system side can be stable. Moreover, the connection or the release of the connection for the phase advance capacitor is selectable according to the state of the phase advance capacitor, and thereby the durability of the devices can be improved.

As described above, in the present invention, when the wind turbine generator is placed in a standby state or stopped in the maintenance mode, the phase advance capacitor which has been released the connection with the power output line is connected to the power output line again by a manual operation or an automatic operation so that the phase advance capacitor can be utilized for the power factor improvement of the distribution system side. Accordingly, the phase advance capacitor provided in the wind turbine generator can be effectively utilized and contribute to the phase factor improvement of the system side.

Moreover, a series of the control mentioned above is performed by the control circuit of the wind turbine generator, and therefore the phase advance capacitor can be most effectively utilized according to the operation state of the wind turbine generator.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
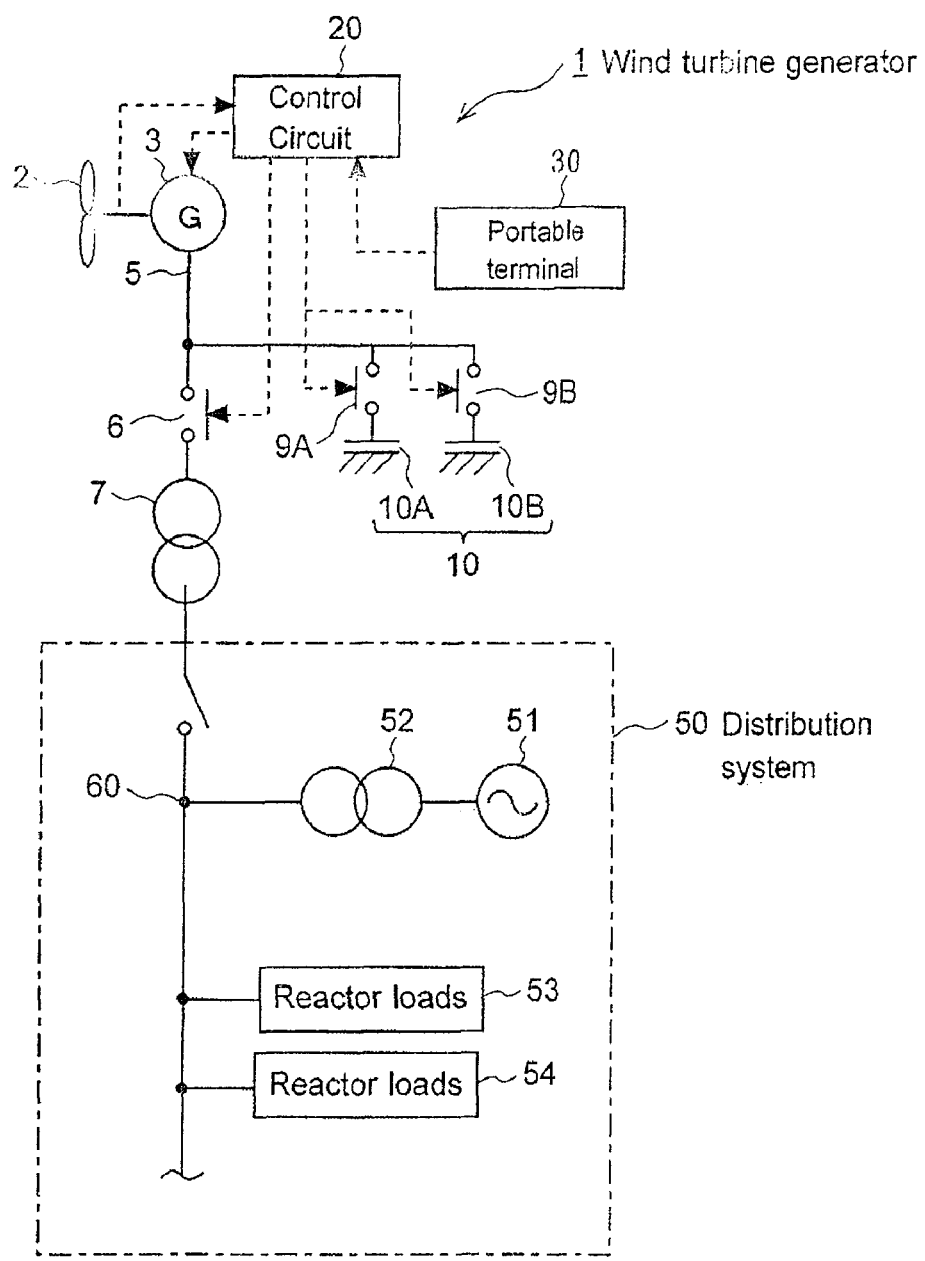
FIG. 1 is a diagram showing an overall construction of a wind turbine generator according to an embodiment of the present invention.

Referring first to FIG. 1, the overall construction of a wind turbine generator according to the embodiment of the present invention will be described.

A wind turbine generator 1 includes an induction generator 3 driven by rotation of blades 2, an power output line 5 for outputting the output power of the induction generator 3 to a distribution system 50, and at least one phase advance capacitor 10 (10A, 10B) parallel-connected to the power output line 5.

A transformer 7 is provided in the power output line 5, while a relay switch 6 is provided between the induction generator 3 and the transformer 7.

The phase advance capacitor 10 is parallel-connected to the power output line 5 via a relay switch 9 (9A, 9B). The relay switch 9 is disposed for connecting or paralleling off the phase advance capacitor 10 with the power output line 5. If a plurality of the phase advance capacitors 10 is provided in the wind turbine generator 1, the relay switches 9A and 9B are, preferably, provided between each of the phase capacitors 10 and the power output line 5, respectively.

The wind turbine generator 1 includes a control circuit 20 for controlling a maintenance operation or a driving operation. The control circuit 20 mainly receives sensor signals from various devices equipped in the wind turbine generator 1 and controls various devices based on the sensor signals.

Preferably, the wind turbine generator 1 further includes an operating signal generating unit provided in the external, wherein the control circuit 20 receives an operating signal from the operating signal generating unit and controls the maintenance operation or the driving operation of the wind turbine generator 1.

The operating signal generating unit may be composed of a portable terminal 30. In the following, an example in which the portable terminal 30 is adopted will be described.

The power output line 5 is linked with a distribution (commercial) system 50 through a linkage portion 60 in the output side of the transformer 7. The linkage portion 60 may include a system interconnection board (not shown), wherein the system interconnection board preferably includes devices required for linkage of the power output line 5 and the distribution system 50.

The distribution system 50 is a system for feeding from a commercial power 51 to reactor loads 53, 54 through a transformer 52. In the present embodiment, the reactor loads 53, 54 are electrical apparatuses connected to the distribution system 50 which is a parallel usage type using the commercial power 51 and the wind turbine generator 1. Particularly, the reactor loads 53, 54 may be the devices within a facility in which the wind turbine generator 1 is provided, or accessories of the wind turbine generator 1.

In the wind turbine generator 1 including the construction described above, the phase advance capacitors 10A, 10B are mainly used for the power factor improvement of the power output in the operation of the wind turbine generator 1. In other words, the relay switch 6 on the power output line 5 is closed by the control circuit 20 and also the relay switch 9A, 9B are closed so that the phase advance capacitors 10A, 10B are connected to the power output line 5, thereby performing the power factor improvement of the cower output.

In the present embodiment, the phase advance capacitors 10A, 10B are further used even when the wind turbine generator 1 is placed in a standby state or stopped, and therefore the phase advance capacitors 10A, 10B contribute to the phase factor improvement of the system 50 side.

Figure 2:
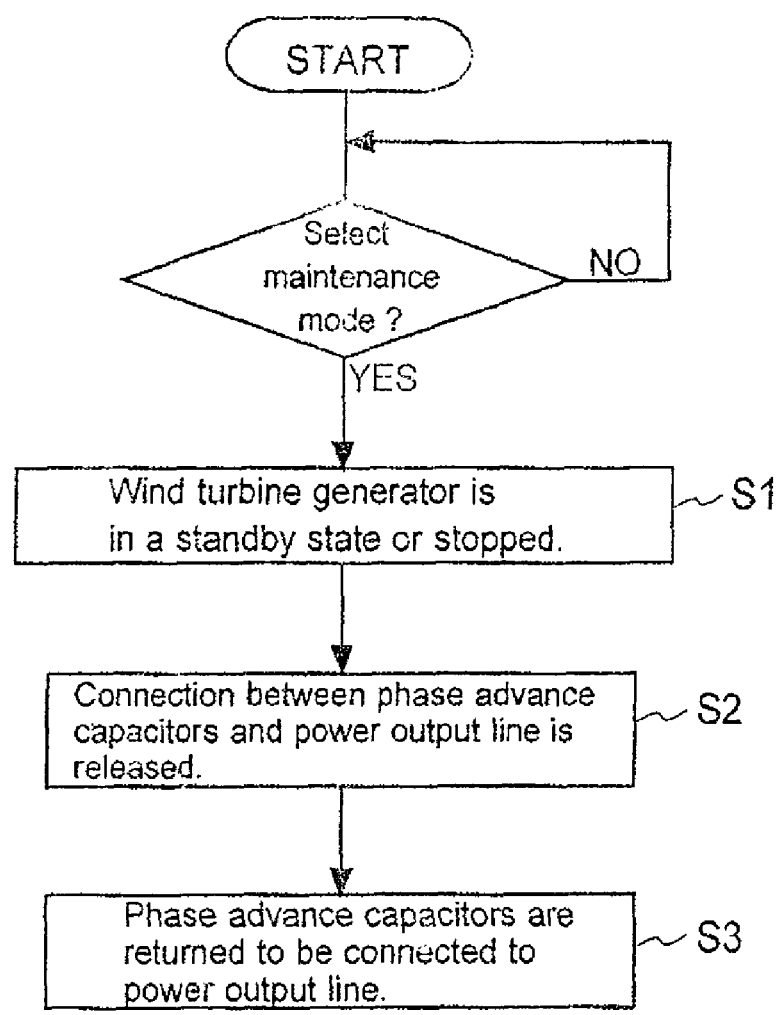
FIG. 2 is a basic flow diagram showing a maintenance method for wind turbine generator according to an embodiment of the present invention.

Referring to FIG. 2, the basic flow showing a maintenance operation method for the wind turbine generator 1 according to the embodiment of the present invention will be described.

If the maintenance mode of the wind turbine generator 1 is selected, the blades 2 are switched to the feathering state (rotation stop) so that the wind turbine generator 1 is placed in a standby state or stopped (S1). At this time, also the relay switches 9A, 9B are closed by the control circuit 20 so that the connection between the phase advance capacitors 10A, 10B and the power output line 5 are released (S2). This state is a conventional standby state or a conventional stopped state of the wind turbine generator 1.

In the present embodiment, the phase advance capacitors 10A, 10B are returned to be connected to the power output line 5 by a manual operation at need or an automatic operation after the maintenance mode is set (S3).

Thus, when the wind turbine generator 1 is placed in the standby state or stopped in the maintenance mode, the phase advance capacitors 10A, 10B which have been released the connection with the power output line are connected to the power output line 5 again by the manual operation or the automatic operation so that the phase advance capacitors 10A, 10B can be utilized for the power factor improvement. Accordingly, the phase advance capacitors 10A, 10B provided in the wind turbine generator can be effectively utilized and contribute to the phase factor improvement of the system side 1.

Next, another embodiment, as a modification of the present embodiment, in which the setting of the re-utilization of the phase advance capacitor 10 (the power factor improvement of the distribution system) is made by using a portable terminal 30 will be described.

Figure 3:
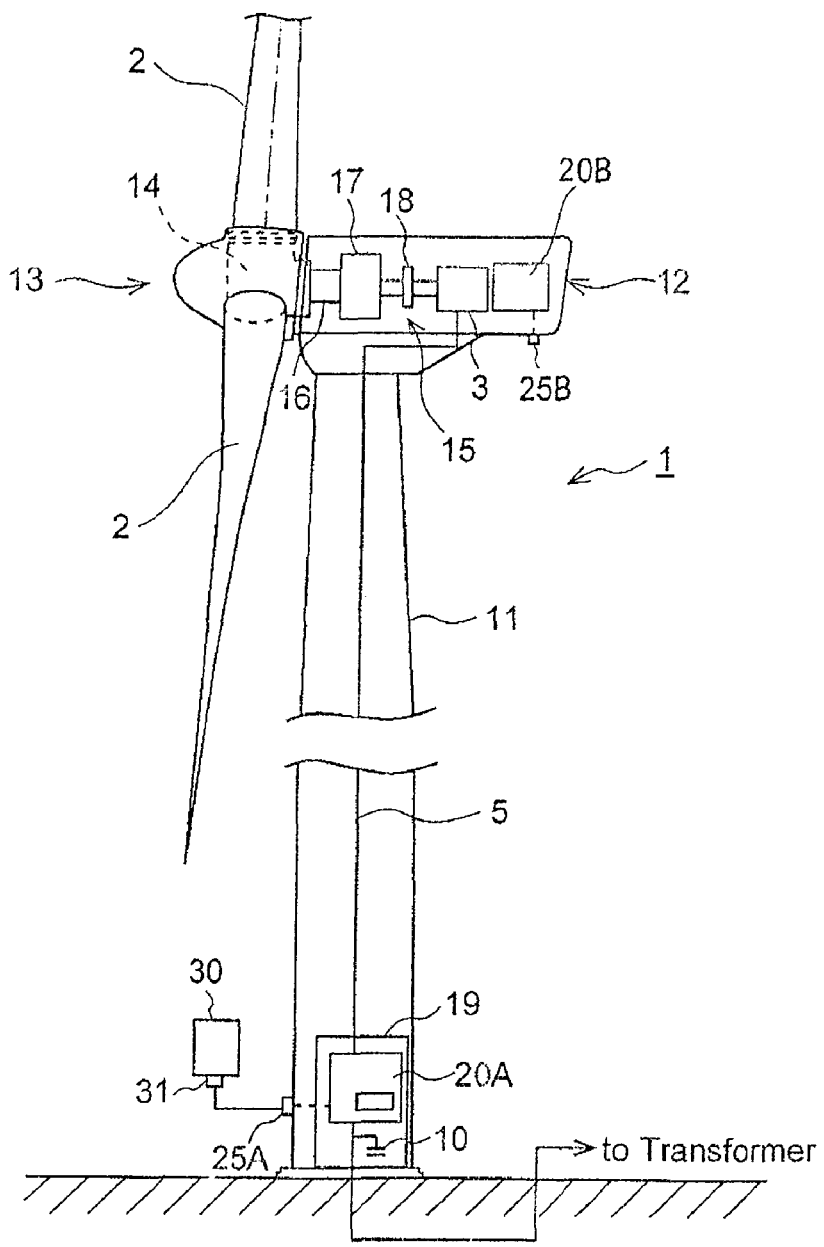
FIG. 3 is a diagram showing an example of the construction of the wind turbine generator.

FIG. 3 is a diagram showing an example of the construction of the wind turbine generator.

The wind power generator 1 includes a tower 11 provided to stand on the foundation set on the ground or on the water, a nacelle 12 provided on the upper end of the tower 2, a rotor head 13 provided on the nacelle 3, a plurality of blades 2 attached to the rotor head 13, and a pitch driving device 14 for driving the blades 5 in the pitching direction.

The tower 11 has a column-like shape extending upwardly from the foundation. The tower 11, for example, can be made from a single column-like member or made from a plurality of units aligned in upright direction and coupled each other. If the tower 11 is made from the plurality of units, the nacelle 12 is provided on the unit located on the top of the tower 11.

The nacelle 12 supports the rotor head 13 and accommodates a drive train 15 and an induction generator 3.

The drive train 15 includes a main shaft 16 connected to the rotor head 13, a speed increasing gear 17 coupled to the main shaft 16, and a coupling 18 for coupling the speed increasing gear 17 to an induction generator 3.

The main shaft 16 is connected the rotor head 13 so that the main shaft 16 can be rotated with the blades 2 and the rotor head 13, while the main shaft 16 is rotatably supported to the casing side of the nacelle 12 by a main shaft bearing.

The speed increasing gear 17 is provided between the main shaft 16 and the coupling 18, and increases the rotational speed input from the main shaft 16 then outputs to the coupling 18. The speed increasing gear 17 is not limited a special type of mechanism, but, for example, can be composed by combination of a planetary gear type mechanism and a spur gear type mechanism (both of them are not shown).

The pitch driving device 14 rotates the blades 2 around its axis (a dashed line in the drawing) so as to change the pitch angle of the blades 2.

The control circuit 20 includes the tower side control circuit 20A provided in the lower portion of the tower 11 and the nacelle side control circuit 20B accommodated within the nacelle 12. Both control circuits 20A and 20B are electrically connected to each other.

The tower side control circuit 20A is accommodated within a power generation board 19. The phase advance capacitor 10 parallel-connected to the power output line 5 may be accommodated within the power generation board 19.

Connectors 25A, 25B corresponding to the tower side control circuit 20A and the nacelle side control circuit 20B, respectively, are provided in the wind turbine generator 1. The connector 25A is electrically connected to the tower side control circuit 20A, and the connector 25B is electrically connected to the nacelle side control circuit 20B. Thus, various operating signals are input from the portable terminal 30 into the control circuits 20A, 20B through the connectors 25A, 25B.

Figure 4:
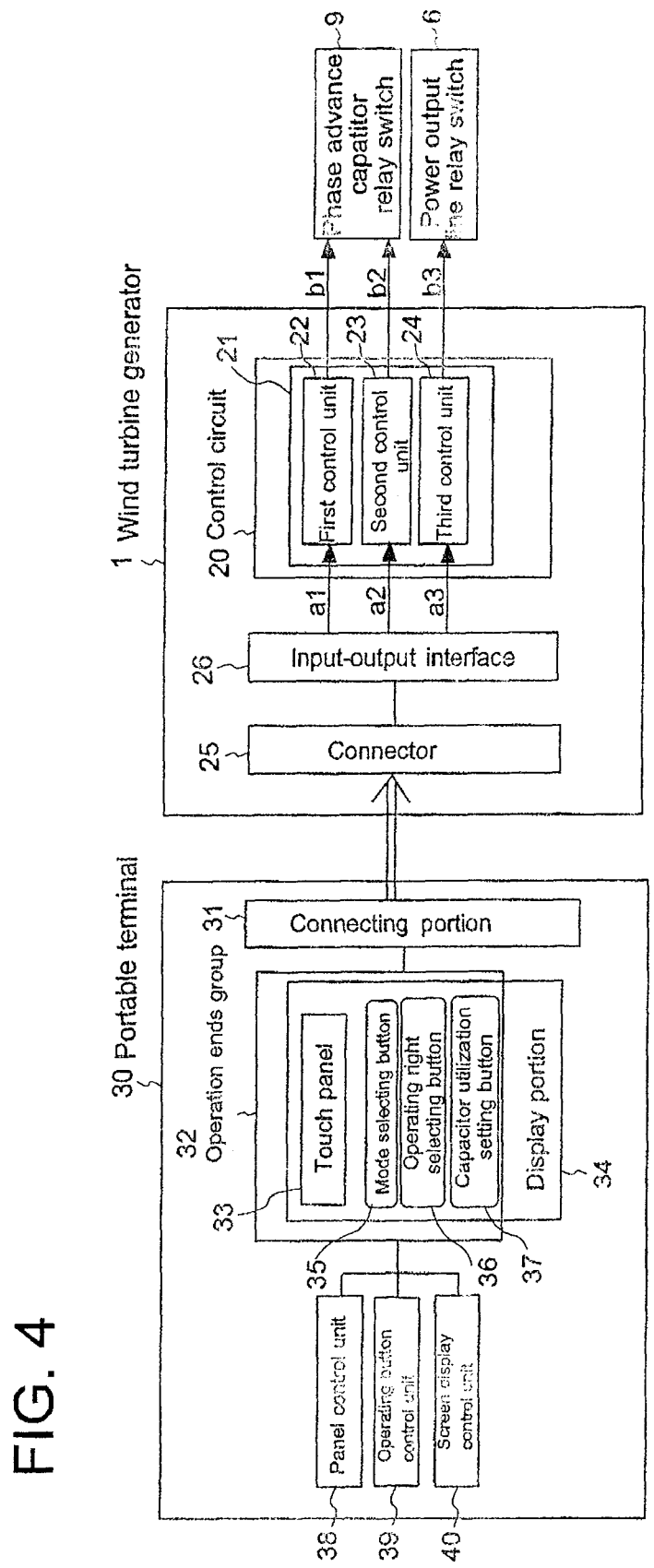
FIG. 4 is a block diagram showing a function of the wind turbine generator according to an embodiment of the present invention.

FIG. 4 is a block diagram showing a function of the wind turbine generator according to an embodiment of the present invention. The wind turbine generator 1 and the portable terminal 30 are drawn separately from each other in FIG. 4. However, the portable terminal 30 is defined to be included in the wind turbine generator 1 because the portable terminal 30 is a kind of the external operating signal generating unit.

Each of the connector 25 of the wind turbine generator 1 and a connecting portion 31 of the portable terminal 30 has the standardized specification among the plurality of the wind turbine generator 1 so that the portable terminal 30 is connectable to any of the wind turbine generators 1.

The connecting portion 31 of the portable terminal 30 may be connected directly to the connector 25 of the wind turbine generator 1, or may be connected through a transmission cable to the connector 25 of the wind turbine generator 1. The data is transmitted from the portable terminal 30 to the wind turbine generator 1 by such connecting manner, and thereby the amount of the data transmitting is increased. Thus, the operating signals of the plurality of the control logics can be transmitted in a short time.

The wind turbine generator 1 mainly includes the connector 25, an input-output interface 26, and the control circuit 20 having a plurality of control logics.

The control circuit 20 receives the operating signals input from the portable terminal 30 through the connector 25 or signals detected by various sensors, performs various processes to generate control signals, and sends these control signals to various devices.

The control circuit 20 is composed of a hardware including CPU, ROM, RAM and memory, etc. Preferably, each function of the control logics is achieved by the hardware. This embodiment shows an example in which each of the control logics is achieved by software, however, each of the control logics can be constituted by hardware logic (logic circuit).

The input-output interface 26 receives signals from the portable terminal 30, various sensors, and various devices, etc., transfers the signals to each control circuit 20, and transmits the control signals generated by the control circuit 20 to various devices. It should be noted that the input-output interface 26 can be defined as including the connector 25.

In the control logics, an operating condition is set based on the operation signals a1, a2, a3, whereby the control logics process under this condition to generate control signals b1, b2, b3.

The operating signals a1, a2, a3 include a selecting signal for selectively validating the control logic or a numeric signal for setting a condition of the control logic. These operating signals a1, a2, a3 are input to the control circuit 20 so that valid/invalid of the control logic is set or numeric condition is input to the control logic, and thereby the control signals b1, b2, b3 are generated by the control logic under the operating condition.

In the embodiment, the control logics include at least a power factor improvement logic 21 for connecting or paralleling off the phase advance capacitor 10 with the power output line 5.

The power factor improvement logic 21 includes a first control unit 22 for paralleling off the phase advance capacitors 10A, 10B from the power output line 5 when receiving the mode switching signal for switching to the maintenance mode; a second control unit 23 for returning the connection between the power output line 5 and the phase advance capacitors 10A, 10B by the operating signal input from the portable terminal 30; and a third control unit 24 for connecting the phase advance capacitors 10A, 10B, which have been returned to the connection with the power output line 5, to the distribution system side through a linkage portion 60 linked with the distribution system 50. The connection or parallel off of the power output line 5 with the phase advance capacitors 10A, 10B is performed by the relay switches 9A, 9B. The connection of the phase advance capacitors 10A, 10B with the distribution system 50 side is performed by the relay switch 6. This power factor improvement logic 21 includes control substantially same as the one described in FIG. 2.

The control circuit 20 may include a plurality of control logics as described above. In the plurality of the wind turbine generator 1 provided in the same site, each of the wind turbine generators preferably includes such combination of control logics as being common among the wind turbine generators 1. Thus, the control circuit 13 includes such common logic which is applicable to the other wind turbine generator 1 in the same site, thereby enabling the construction of the control circuit 13 to be standardized, and therefore the cost reduction can be achieved.

The portable terminal 30 mainly includes the connecting portion 31, an operating ends group 32 and a display portion 34. The portable terminal 30 may further include a panel control unit 38, an operating button control unit 39 and a screen display control unit 40.

The portable terminal 30 selectively switches an operation control mode and a maintenance mode so as to perform a predetermined control corresponding to each switched mode.

The display portion 34 displays the operating state of the operating ends, and a liquid crystal display is used as the display portion.

The operating ends group 32 generates an operating signal for selectively validating the control logic within the control circuit 20 installed in the wind turbine generator 1. The operating ends group 32 may be composed of a key board provided separately from the display portion 34. Preferably, the operating ends group 32 is composed of a touch panel 33 operable by touching on the screen surface of the display portion 34. It is possible to adopt the common method (for example, a resistive layer method) as the operating method for the touch panel 33.

The operating ends group 32 includes a mode selecting button 35 for selectively validating one of a maintenance mode and an operating control mode; an operating right selecting button 36 for selecting one of the control circuits 20 to be granted an operating right; and a capacitor utilization setting button 37 for setting the utilization of the phase advance capacitor when the maintenance mode is selected by the mode selecting button 35. Preferably, these buttons are displayed on the touch panel 33.

The panel control unit 38, which is provided in case that the operating ends are composed of the touch panel 33 displayed on the display portion 34, displays the aimed operating button, and generates an operating signal when detecting pressure to the operating button on the touch panel 33. Thus, the panel control unit 38 displays the aimed operating button on the touch panel 33, and thereby the selecting button and the operating button are displayed in the same screen so as to enable the visually easy operation. Preferably, the capacitor utilization setting button 37 is displayed on the display portion 34 by the panel control unit 28 when the maintenance mode is selected.

The operating button control unit 39 mainly controls displaying of the operating buttons of the operating ends group 32 on the display portion 34 or validity/invalidity of operation of the operating buttons. The operating button control unit 39 enables the operating buttons to be displayed on the display portion 34 according to a kind of the work or enables validity/invalidity of operation of the operating buttons to be controlled, and therefore the operational performance of the portable terminal can be improved. Particularly, in case that one wind turbine generator 1 includes a plurality of the control circuits 20A, 20B, the operating button control unit 39 controls displaying of or validity/invalidity of operation of the operating buttons at need, and thereby it is possible to prevent the unstable performance of the control for the maintenance work caused by the mixed operating signals sent from two control circuits or the deterioration of the safety of the maintenance work.

In case that a plurality of the control circuits 20 exist, the operating button control unit 39 preferably includes a function to grant one of the control circuits 13 an operating right. The operating right is for setting validity/invalidity of the operation input from the operating button. The operating button control unit 39 accepts the operation from the portable terminal 30 which is granted the operating right, while rejecting the operation from the portable terminal 30 which is not granted the operating right. Instead, it is possible to set, in advance, the operating button on which the restriction for validity/invalidity of the operation is placed.

As described above, when the wind turbine generator 1 is placed in a standby state or stopped in the maintenance mode, the phase advance capacitor 10 which has been released the connection with the power output line 5 is connected to the power output line 5 again by the operating signal from the portable terminal 30 so that the phase advance capacitor can be utilized for the power factor improvement of the distribution system 50 side. Accordingly, the phase advance capacitor 10 provided in the wind turbine generator 1 can be effectively utilized and contribute to the phase factor improvement of the system side. Moreover, a series of the control mentioned above is performed by the control circuit 20 of the wind turbine generator 1, and therefore the phase advance capacitor 10 can be most effectively utilized according to the operation state of the wind turbine generator 1.

Figure 5:
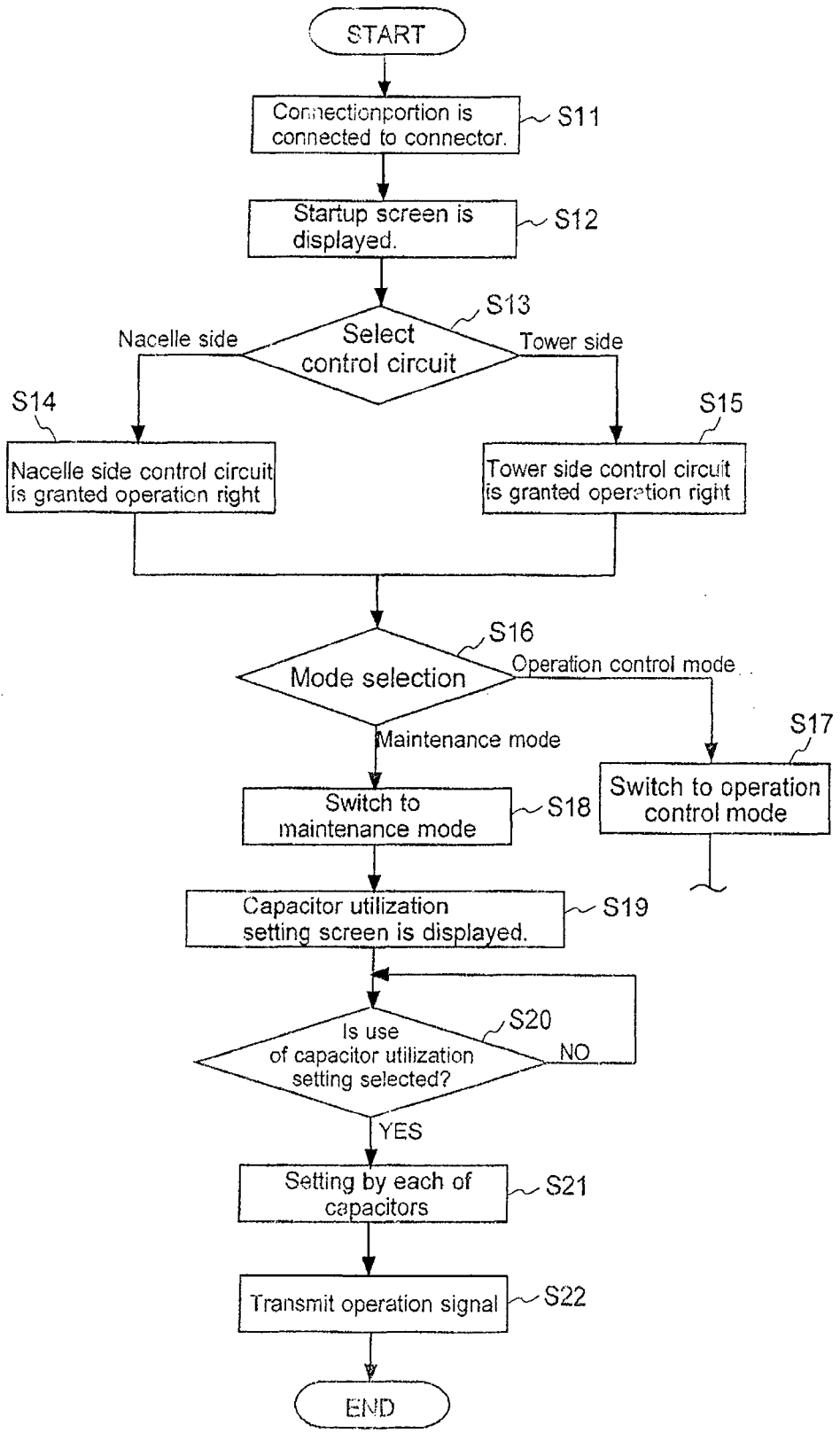
FIG. 5 is a flowchart showing an operation of the handy terminal.
Figure 6:
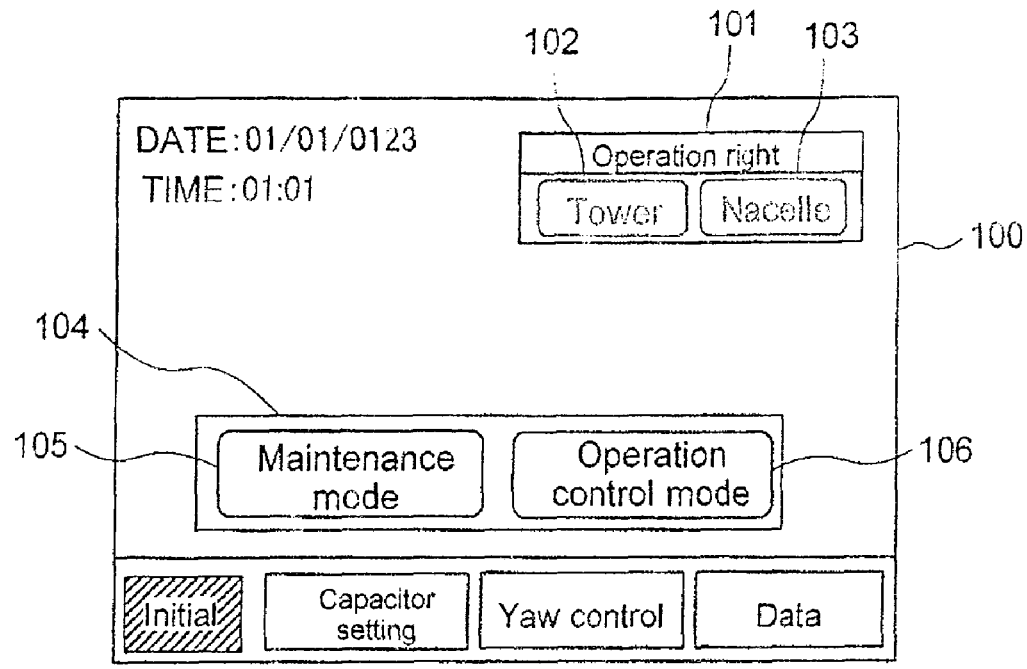
FIG. 6 is a diagram showing an example of the startup screen.
Figure 7:
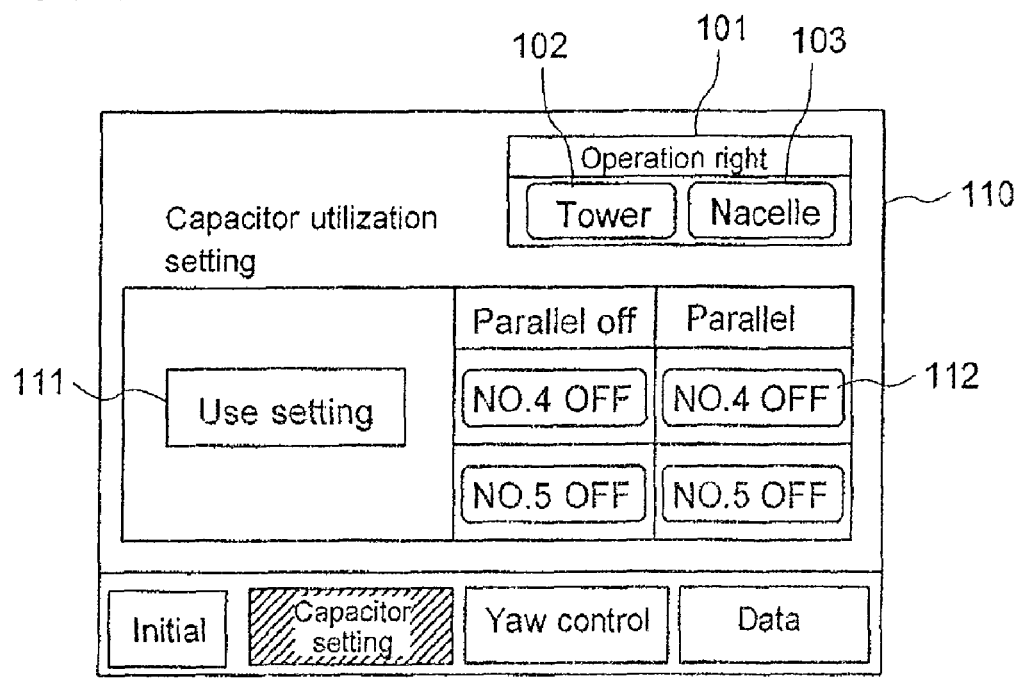
FIG. 7 is a diagram showing an example of the capacitor utilization setting screen.

Next, referring to FIGS. 5 to 10, the specific operation of the portable terminal 30 will be described. FIG. 5 is a flowchart showing the operation of the portable terminal, FIG. 6 is a diagram showing an example of the startup screen of the portable terminal, FIG. 7 is a diagram showing an example of the capacitor utilization setting screen.

It should be noted that the flowchart is, as an example, directed to the wind turbine generator 1 including the tower side control circuit 20A provided in the lower part of the tower and the nacelle side control circuit 20B accommodated in the nacelle.

First, the connection portion 31 of the portable terminal 30 is connected to the connector 25 of the wind turbine generator 1 (S11), then, a startup screen is displayed after an electric source of the portable terminal 30 is ON (S12). One example of the startup screen is shown in FIG. 6. An operation right selecting button 101 for setting the operation right and a mode selecting button 104 for selecting one of the maintenance mode and operation control mode are displayed on the startup screen 100

The operation right selecting button 101 includes a tower button (a tower side control circuit button) 102 and a nacelle button (a nacelle side control circuit button) 103, and the operator pushes the button for the side connected with the handy terminal 20 to select the control circuit 20 (S13).

If the nacelle button 103 is pushed, the control circuit 20B of the nacelle side is granted the operation right so that the operating signal from the portable terminal 30 connected to the control circuit 20B of the nacelle side is accepted (S14). At this point, the operating signal from the portable terminal 30 connected to the control circuit 20A of the tower side is not accepted.

On the other hand, if the tower button 102 is pushed, the control circuit 20A of the nacelle side is granted the operation right, the operating signal from the portable terminal 30 connected to the control circuit 20A of the tower side is accepted (S15). At this point, the operating signal from the portable terminal 30 connected to the control circuit 20B of the nacelle side is not accepted.

The following steps are operation of the portable terminal 30 for the control circuit 20 in the selected side.

If the operation right for the control circuit 20 is selected, then the operator selects the mode by the mode selecting button 104 (S16). The mode selecting button 104 includes a maintenance mode button 105 and an operation control button 106. If the operation control button 106 is pushed, the wind turbine generator 1 is switched to the operation control mode (S17). If the maintenance mode button 105 is pushed, the wind turbine generator 1 is switched to the maintenance mode (S18). The explanations for the processes of the operation control mode are omitted.

If the wind turbine generator 1 is switched to the maintenance mode, a capacitor utilization setting screen is displayed (S19). One example of the capacitor utilization setting screen is shown in FIG. 7. The capacitor utilization setting button 111 for selecting whether the utilization setting of the phase advance capacitor 10 should be used or not, and, if a plurality of the phase advance capacitors 10 is provided, an individual setting button 112 for setting the parallel off or parallel (connection) by each of the capacitors.

If the use of the capacitor utilization setting is selected by the capacitor utilization setting button 111 (S20), then the parallel off or parallel (connection) of the phase advance capacitors 10A, 10B is set by the individual setting button 112 by each of the capacitors (S21). If the capacitor utilization setting button 111 is pushed once, the utilization setting is set as use. Then, if the capacitor utilization setting button 111 is pushed again, the utilization setting is set as non-use.

If the parallel off or connection in each phase advance capacitor 10A, 10B is set, the operating signals are transmitted to the control circuit 20.

Then, the control circuit 20 performs the power factor improvement control logic described above based on the operating signals.

Thus, when the wind turbine generator 1 is placed in a standby state or stopped in the maintenance mode, the phase advance capacitors 10A, 10B are paralleled with or paralleled off the power output line 5 based on the operating signals input from the capacitor utilization setting button 111 and the individual setting button 112 of the operating ends group 32 such as a touch panel. Therefore, the power factor of the distribution system 50 side is improved by an easy operation at need. Moreover, since the operating signal related to setting of the capacitor utilization is input from the portable terminal 20, the phase advance capacitor can be quickly utilized again by an operator corresponding to the operation switching to the standby state or the stop operation of the wind turbine generator 1 in the maintenance thereof. Accordingly, the convenience of the wind power generator 1 can be improved and the occupancy of utilization of each phase advance capacitor 10A, 10B can be raised. Furthermore, the connection of each phase advance capacitor 10 is individually set according to the lagging power factor estimated in the distribution system 50 side, and thereby the performance of the power factor improvement in the system side can be stable.

The invention claimed is:
1. A maintenance operation method for a wind turbine generator, including an induction generator driven by rotation of blades, a power output line for outputting power of the induction generator to a distribution system, and at least one phase advance capacitor parallel-connected to the power output line, comprising;

a first step of releasing connection between the phase advanced capacitor and the power output line when a maintenance mode for placing the blades in a feathering state (rotation stop) is selected; and a second step of returning the connection between the phase advanced capacitor and the power output line by a manual operation or an automatic operation, wherein the phase advance capacitor returned to the connection with the power output line performs a power factor improvement of reactor loads in the distribution system side through a linkage portion with the distribution system.

2. A wind turbine generator including a nacelle supported on the a tower provided to stand on the ground or on the water, and a plurality of blades with blade pitch control supported to the nacelle, wherein an induction generator driven by rotation of the blades is accommodated in the nacelle, and a power output line for outputting power of the induction generator to a distribution system and at least one phase advance capacitor parallel-connected to the power output line are accommodated in the nacelle or the tower, comprising:

a control circuit provided in at least one of the nacelle or the tower, and for connecting of or releasing the connecting of the power output line and the phase advance capacitor, wherein the control circuit includes a first control unit for releasing connection between the phase advanced capacitor and the power output line when the blades are switched from a rotation mode for rotating the blades to a maintenance mode for placing the blades in a feathering state (rotation stop); a second control unit for returning the connection between the phase advanced capacitor and the power output line by an operation signal from an operating signal generating unit provided in the external; and a third control unit for connecting the phase advance capacitor, which has been returned to the connection with the power output line, to the distribution system side through a linkage portion linked with the distribution system.

3. A wind turbine generator according to claim 2, wherein the operating signal generating unit provided in the external includes a portable terminal, the portable terminal comprising: a connecting portion connectable to a connector provided in at least one of the nacelles and the tower; an operating ends group includes an operating button generates an operating signal for connecting of or releasing the connecting of the power output line and the phase advance capacitor; and a display portion for displaying an operation state of the operating ends group.

4. A wind turbine generator according to claim 3, wherein a plurality of the phase advance capacitors are parallel-connected to the power output line, and the operating ends group can set individually connecting of or releasing of the connecting of each of the phase advance capacitors and the power output line.

* * * * *